(12) United States Patent
Heinrichs

(10) Patent No.: US 8,479,662 B2
(45) Date of Patent: Jul. 9, 2013

(54) RAIL VEHICLE HAVING A VEHICLE DOOR SEAL

(75) Inventor: Björn Heinrichs, Willich (DE)

(73) Assignee: Siemens Aktiengesellschaft, München (DE)

( * ) Notice: Subject to any disclaimer, the term of this patent is extended or adjusted under 35 U.S.C. 154(b) by 27 days.

(21) Appl. No.: 13/024,359

(22) Filed: Feb. 10, 2011

(65) Prior Publication Data

US 2012/0204493 A1 Aug. 16, 2012

(51) Int. Cl.
*B61D 3/00* (2006.01)
(52) U.S. Cl.
USPC .................................. 105/282.2; 105/253
(58) Field of Classification Search
USPC ........................................ 105/282.1, 282.2
See application file for complete search history.

(56) References Cited

U.S. PATENT DOCUMENTS

| 3,611,947 | A | * | 10/1971 | Nagy | 105/253 |
|---|---|---|---|---|---|
| 4,551,376 | A | | 11/1985 | Kessler | |
| 5,038,966 | A | * | 8/1991 | Olk | 222/504 |
| 6,263,803 | B1 | * | 7/2001 | Dohr et al. | 105/282.3 |
| 7,291,947 | B2 | * | 11/2007 | Hashiba et al. | 310/54 |
| 2002/0098102 | A1 | * | 7/2002 | Gennami et al. | 418/55.4 |
| 2007/0057471 | A1 | * | 3/2007 | Rentschler | 277/559 |
| 2007/0235262 | A1 | * | 10/2007 | Takahashi et al. | 184/6.5 |
| 2010/0254639 | A1 | * | 10/2010 | Yamazaki | 384/100 |
| 2012/0007319 | A1 | * | 1/2012 | Miura et al. | 277/549 |

FOREIGN PATENT DOCUMENTS

| DE | 112005000573 T5 | 2/2007 |
|---|---|---|
| DE | 102009007429 A1 | 8/2010 |
| EP | 1624147 A1 | 2/2006 |

* cited by examiner

*Primary Examiner* — Jason C Smith

(57) ABSTRACT

A rail vehicle with a vehicle door connected to an associated door frame via a seal is provided. The seal as well as other mechanical components have to be lubricated. Therefore, a door region is equipped with at least one device for automatically dispensing lubricants for lubricating the seal and/or the mechanical components.

3 Claims, 1 Drawing Sheet

RAIL VEHICLE HAVING A VEHICLE DOOR SEAL

FIELD OF INVENTION

The invention relates to a rail vehicle having at least one vehicle door arrangement which can be connected to an associated door frame via a seal to be lubricated and has mechanical components likewise to be lubricated.

BACKGROUND OF INVENTION

With regard to the lubrication of door systems, with in this context both mechanical components and the seals being meant, attempts are made to reduce the number of lubricating procedures ever further in order to lower maintenance costs.

As is known, insufficient lubrication has a negative effect on the lifetime, availability and reliability of door systems. Inadequate lubrication leads to an increase in the cost of repairing the door systems.

The lubrication of door systems, in full or in part, is understood today as a purely manual activity. According to typical maintenance manuals, the components in question are lubricated manually in predetermined cycles. This is a very complicated method and is therefore considered to be disadvantageous.

SUMMARY OF INVENTION

An object of the invention is to further develop a rail vehicle such that lubrication of the door system components in question becomes less complicated.

This object is achieved in that a door region is equipped with at least one device for automatically dispensing lubricants for lubricating the seal and/or the mechanical components.

With the aid of the device provided for automatically dispensing lubricants in the door region, it is possible to lubricate the mechanical components and/or seals of the vehicle door arrangement with little effort. Manual lubrication of these components is still necessary to a limited degree at most.

It should be noted that availability of so-called "maintenance-free" seals and mechanical components can also be increased by lubrication. Such seals and components are expressly included in the invention.

Preferably, the device for automatically dispensing lubricants can be formed by a nozzle which is connected to a lubricant storage container via a feed line. In principle, a plurality of nozzles can be arranged in the door region, the respective position of said nozzles also being determined by the position of a component or nozzle to be lubricated in each case. A joint lubricant storage container can be used. Alternatively, it is also possible for each individual nozzle to be connected to a separate lubricant storage container.

A valve can preferably be provided on an output side of the lubricant storage container, the actuation of which valve is controlled by a control means. The control means determines, for example, the quantity of lubricant to be dispensed, and in this context it is also determined at which points in time re-lubrication should be carried out. In this case, the control means for actuating the valve can preferably operate as a function of a measured or estimated number of door-opening cycles.

It is particularly favorable for the device for automatically dispensing lubricants to be installed in a door frame. This means, in the embodiment of this device as a nozzle, that said device is substantially accommodated in the door frame and dispenses lubricants toward the interface between the vehicle door and the door frame. In this way, it is possible to reliably lubricate the seal provided between the door frame and the vehicle door. A different location for the associated nozzle may be appropriate in particular in the case of mechanical components of the vehicle door arrangement.

BRIEF DESCRIPTION OF THE DRAWINGS

Exemplary embodiments of the invention will be explained in more detail below with reference to the drawings, in which.

DETAILED DESCRIPTION OF INVENTION

Figure 1:
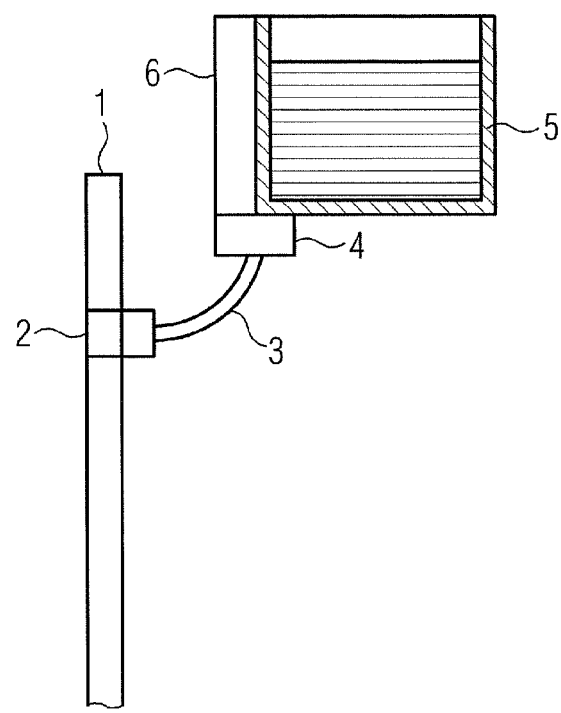
FIG. 1 shows a schematic side view of a vehicle door frame in combination with components to be supplied with lubricant and FIG. 2 shows a cross-sectional view of a transition region between a vehicle door and a door frame.

FIG. 1 schematically illustrates a door frame 1 which interacts with a vehicle door 7 (not illustrated in FIG. 1). By way of example, a nozzle 2 is installed in the door frame 1 and is connected via a feed line 3 and a valve 4 to a storage container 5 for lubricants. The valve 4 is controlled by a control means 6. Alternatively, it is possible for the valve and the control means to be positioned directly at the nozzle 2.

The outside, and thus a sealing surface for a seal for the vehicle door 7, is located on the left-hand side of the door frame 1 in FIG. 1, while the inside is on the right-hand side of the door frame 1. The nozzle 2 provided is provided for dispensing lubricant from the storage container 5, which, as is indicated in FIG. 1, flows downward out of the nozzle 2. A sealing surface for the door seal can thus be coated with lubricant.

Figure 2:
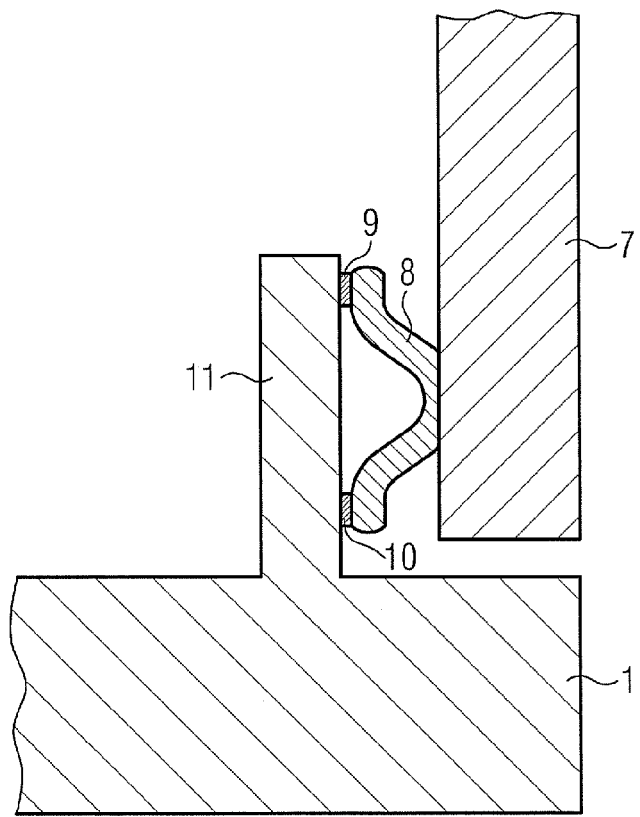

FIG. 2 shows by way of a sectional illustration the transition region between the door frame 1 and the vehicle door 7, which bears a seal 8. The seal 8 rests against two spaced-apart contact lines 9, 10 (alternatively, only one contact line may be present) at an associated region 11 of the door frame 1. It can be seen that lubricants are present in the region of the contact lines 9, 10.

The control means 6 takes into account the extent to which re-lubrication is necessary on account of operation of the vehicle door 7. To this end, it can resort to measured values, such as a number of door-opening cycles, or to an estimated number. Such an estimation can be based, for example, on a number of operating hours of the rail vehicle.

In the exemplary embodiment illustrated, the lubrication process is described in the region of the seal 8. Corresponding lubrication is also possible for mechanical components of the door arrangement, which consists of the door frame 1 and the vehicle door 7. To this end, a further nozzle operating substantially in the same way as the nozzle 2 would need to be arranged at a corresponding location in the door region. Guide rails of a door drive are an example of mechanical components to be lubricated The further nozzle can be connected, for example via a further feed line, a further valve, to a further storage container, wherein an additional control means can also be used. In this case, it should be taken into account that different components of the door arrangement can also require lubrication at different frequencies.

The invention claimed is:

1. A rail vehicle, comprising:
   a vehicle door connected to an associated door frame via a seal to be lubricated, the vehicle door including mechanical components to be lubricated, wherein a region of the door is equipped with a device for automatically dispensing lubricants for lubricating the seal and/or the mechanical components, wherein the device for automatically dispensing lubricants is formed by a nozzle which is connected to a lubricant storage container via a feed line, wherein a valve is provided on an output side of the lubricant storage container, and wherein an actuation of the valve is controlled by a control unit.

2. The rail vehicle as claimed in claim 1, wherein the control unit for actuating the valve operates based upon a measured or estimated number of door-opening cycles.

3. The rail vehicle as claimed in claim 1, wherein the device for automatically dispensing lubricants is installed in a door frame.

\* \* \* \* \*